(12) United States Patent
Heubi

(10) Patent No.: US 10,305,319 B2
(45) Date of Patent: May 28, 2019

(54) SWITCHING CONVERTER FOR REDUCING CURRENT CONSUMPTION IN SLEEP MODE

(71) Applicant: SEMICONDUCTOR COMPONENTS INDUSTRIES, LLC, Phoenix, AZ (US)

(72) Inventor: Alexander Heubi, La Chaux-de-Fonds (CH)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 15/974,164

(22) Filed: May 8, 2018

(65) Prior Publication Data

US 2019/0067984 A1    Feb. 28, 2019

Related U.S. Application Data

(60) Provisional application No. 62/549,645, filed on Aug. 24, 2017.

(51) Int. Cl.
*H02J 9/00* (2006.01)
*H02M 3/157* (2006.01)
(Continued)

(52) U.S. Cl.
CPC ............. *H02J 9/005* (2013.01); *G05F 1/46* (2013.01); *H02M 3/157* (2013.01); *H02M 3/158* (2013.01);
(Continued)

(58) Field of Classification Search
CPC . H02M 2001/0032; H02M 2001/0035; H02M 3/158; H02M 2003/1566
(Continued)

(56) References Cited

U.S. PATENT DOCUMENTS

| 7,439,716 B2 * | 10/2008 | Gay ...................... H02M 3/156 323/224 |
| 2007/0176588 A1 * | 8/2007 | Nishida ................. H02M 3/158 323/284 |

(Continued)

FOREIGN PATENT DOCUMENTS

| CN | 105827112 A | 8/2016 |
| WO | 2016064614 A1 | 4/2016 |

OTHER PUBLICATIONS

Linear Technology Corporation, "LTC3388-1/LTC3388-3 20V High Efficiency Nanpopower Step-Down Regulator," Aug. 10, 2015.

(Continued)

*Primary Examiner* — Gary A Nash
(74) *Attorney, Agent, or Firm* — Brake Hughes Bellermann LLP

(57) ABSTRACT

According to an aspect, an electronic device includes a switching converter configured to generate an output voltage with a first voltage level from a battery voltage in a run mode of the electronic device. The switching converter is configured to generate the output voltage with a second voltage level from the battery voltage in a sleep mode of the electronic device. The second voltage level is less than the first voltage level. The switching converter includes a clocked comparator, and a voltage comparator. The switching converter is configured to generate the output voltage with the first voltage level in the run mode using the clocked comparator. The switching converter is configured to generate the output voltage with the second voltage level in the sleep mode using the voltage comparator.

20 Claims, 9 Drawing Sheets

(51) Int. Cl.
  *G05F 1/46* (2006.01)
  *H02M 1/00* (2006.01)
  *H02M 3/158* (2006.01)
  *H02M 3/156* (2006.01)

(52) U.S. Cl.
  CPC ............... *H02M 2001/0022* (2013.01); *H02M 2001/0032* (2013.01); *H02M 2001/0035* (2013.01); *H02M 2003/1566* (2013.01)

(58) Field of Classification Search
  USPC ............... 323/266, 274, 275, 277, 284, 285
  See application file for complete search history.

(56) References Cited

U.S. PATENT DOCUMENTS

| | | | |
|---|---|---|---|
| 2008/0246448 A1* | 10/2008 | Chiu | H02M 3/156 323/234 |
| 2009/0230934 A1 | 9/2009 | Hooijschuur et al. | |
| 2009/0322300 A1* | 12/2009 | Melanson | H02M 3/1563 323/284 |
| 2013/0049716 A1* | 2/2013 | Saeki | H02M 3/156 323/271 |
| 2014/0160601 A1* | 6/2014 | Ouyang | H02M 3/158 361/18 |
| 2015/0091536 A1* | 4/2015 | Tanaka | H02M 3/156 323/235 |
| 2016/0014700 A1 | 1/2016 | Taha et al. | |
| 2016/0111956 A1* | 4/2016 | Childs | H02M 3/156 323/271 |
| 2016/0124447 A1 | 5/2016 | Kobayashi | |
| 2017/0235321 A1 | 8/2017 | Cui | |
| 2017/0248980 A1 | 8/2017 | Hanson et al. | |

OTHER PUBLICATIONS

Analog Devices, Inc., "50 mA/500 mA, High Efficiency, Ultralow Power Step-Down Regulator," Data Sheet ADP5301, Rev. B, Jun. 13, 2016.
Maxim Integrated Products, Inc., "Max77596 24V, 300mA, Buck Converter with 1.1µA IQ," 19-7733; Rev. 1; Mar. 2016.
Texas Instruments, "TPS62746 300/400 mA High Efficiency Buck Converter with Ultra-low Quiescent Current and VIN Switch," SLVSD27A, Jun. 2015, Revised Aug. 2015.
Torex Semiconductor Ltd., "XC9265 Series Ultra Low Power Synchronous Step-Down PFM DC/DC Converter," Oct. 29, 2015.

* cited by examiner

SWITCHING CONVERTER FOR REDUCING CURRENT CONSUMPTION IN SLEEP MODE

CROSS-REFERENCE TO RELATED APPLICATION

This application claims the benefit of and priority to U.S. Provisional Application No. 62/549,645, filed Aug. 24, 2017, entitled "Nano-amp quiescent current DC-DC converter", the content of which is hereby incorporated by reference in its entirety.

TECHNICAL FIELD

This description relates to a DC-DC converter that reduces the current consumption of a circuit in sleep mode.

BACKGROUND

With the growth of the Internet of things (IoT), many battery powered devices are operating at low duty cycles, spending the majority of the time in sleep mode while being active only during short periods to make acquisitions and/or establish connections. In such situations, the sleep mode power may become a major contributor to the average current consumption.

SUMMARY

According to an aspect, an electronic device includes a switching converter configured to generate an output voltage with a first voltage level from a battery voltage in a run mode of the electronic device. The switching converter is configured to generate the output voltage with a second voltage level from the battery voltage in a sleep mode of the electronic device. The second voltage level is less than the first voltage level. The switching converter includes a clocked comparator, and a voltage comparator. The switching converter is configured to generate the output voltage with the first voltage level in the run mode using the clocked comparator. The switching converter is configured to generate the output voltage with the second voltage level in the sleep mode using the voltage comparator.

According to some aspect, the electronic device may include one or more of the following features (or any combination thereof). The clocked comparator may compare a reference voltage with the output voltage at a time indicated by a clock signal, and, in response to the reference voltage being less than the output voltage, the clocked comparator may generate a charge signal to trigger a pump cycle to increase the output voltage to be closer to the first voltage level. The voltage comparator may compare an internal reference voltage with the output voltage, and, in response to the internal reference voltage being less than the output voltage, the voltage comparator may generate a charge signal to trigger a pump cycle to increase the output voltage to be closer to the second voltage level. The voltage comparator may include a first transistor and a second transistor. The first transistor is coupled to the second transistor such that a voltage threshold of the first transistor in combination with a voltage threshold of the second transistor defines the internal reference voltage. The switching converter may include a pulse generator connected to the clocked comparator and the voltage comparator. The pulse generator may generate a pulse signal during the run mode in response to a charge signal from the clocked comparator. The pulse generator may generate a pulse signal during the sleep mode in response to a charge signal from the voltage comparator. The pulse generator may include a current bias generator configured to generate a bias current to bias one or more nodes of the pulse generator. The pulse generator may generate the pulse signal in the run mode or the sleep mode according to a constant charging current in which a constant amount of current is provided through an inductor of the switching converter. The pulse generator may generate the pulse signal in the run mode or the sleep mode according to a constant output voltage ripple. The switching converter may include a current limiter configured to monitor a current through an inductor of the switching converter, and, in response to the current through the inductor exceeding a current threshold, the current limiter may stop a charge cycle. The electronic device may include a linear regulator, and the current limiter may trigger the linear regulator in response to the current through the inductor exceeding the current threshold.

According to an aspect, an electronic device includes a switching converter configured to generate an output voltage with a first voltage level from a battery voltage in a run mode of the electronic device. The switching converter is configured to generate the output voltage with a second voltage level from the battery voltage in a sleep mode of the electronic device. The second voltage level is less than the first voltage level. The switching converter includes a clocked comparator configured to generate a first charge signal during the run mode, a voltage comparator configured to generate a second charge signal during the sleep mode, and a pulse generator configured to generate a pulse signal for driving a switching circuit in response to either the first charge signal or the second charge signal.

According to some aspect, the electronic device may include one or more of the following features (or any combination thereof). The clocked comparator may compare a reference voltage with the output voltage at a time indicated by a clock signal, and, in response to the reference voltage being less than the output voltage, the clocked comparator may generate the first charge signal. The voltage comparator may compare an internal reference voltage with the output voltage, and, in response to the internal reference voltage being less than the output voltage, the voltage comparator may generate the second charge signal. The voltage comparator may include a first transistor and a second transistor. The first transistor is coupled to the second transistor such that a voltage threshold of the first transistor in combination with a voltage threshold of the second transistor defines the internal reference voltage. The pulse generator may include a current bias generator configured to generate a bias current to bias one or more nodes of the pulse generator. The pulse generator may generate the pulse signal in the run mode or the sleep mode according to a constant charging current in an inductor of the switching converter. The pulse generator may generate the pulse signal in the run mode or the sleep mode according to a constant output voltage ripple.

According to an aspect, a method for reducing current consumption in an electronic device having a switching converter includes comparing, by a clocked comparator, an output voltage with a reference voltage during a run mode of the electronic device, generating, by the clocked comparator, a first charge signal to trigger a pump cycle to increase the output voltage using the switching converter in response to the output voltage being less than the reference voltage, comparing, by a voltage comparator, the output voltage with an internal voltage reference of the voltage comparator during a sleep mode of the electronic device, and generating, by the voltage comparator, a second charge signal to trigger the pump cycle to increase the output voltage using the switching converter in response to the output voltage being less than the internal voltage reference.

According to some aspect, the method may include one or more of the following features (or any combination thereof). The method may further include monitoring a current through an inductor of the switching converter, stopping a charge cycle of the switching converter in response to the current exceeding a current threshold, and increasing the output voltage using a linear regulator instead of the switching converter. The method may further include generating, by a pulse generator, a pulse signal to control switching operations of the switching converter in response to the first charge signal or the second charge signal.

The details of one or more implementations are set forth in the accompanying drawings and the description below. Other features will be apparent from the description and drawings, and from the claims.

DETAILED DESCRIPTION

The present disclosure relates to a DC-DC switching converter (e.g., buck converter) that provides efficient energy conversion not only during peak power consumption phases but also under light load conditions. For example, the switching converter discussed herein may operate in a run mode to generate an output voltage with a first voltage level, and efficiently switch to a sleep mode to generate an output voltage with a second voltage level (and vice versa), where the second voltage level is less than the first voltage level. The second voltage level (e.g., the sleep voltage) may be used to power a portion of circuitry of a battery-powered device. For example, in the sleep mode, a portion of the circuity is deactivated while another portion of the circuitry is powered to provide one or more operations during the sleep mode such as powering a real-time clock and/or maintaining memory retention.

The switching converter discussed herein may reduce the amount of current drawn from the battery during the sleep mode, thereby saving power. The switching converter may include a clocked comparator and a voltage comparator (and regulator). The switching converter may use the clocked comparator in the run mode to generate the output voltage with the first voltage level, and use the voltage comparator in the sleep mode to generate the output voltage with the second voltage level. The switching converter may include a current limiter circuit that monitors the current through an inductor of the switching converter, and, in response to the current exceeding a threshold level (e.g., in the presence of a high magnetic field or inductor saturation), the current limiter circuit may stop a charging cycle of the switching converter and/or automatically switch to a linear regulator in order to help prevent an overcurrent situation. In addition, the timing circuit and/or the current limiter circuit may be activated quickly during the charging cycle (either during the run mode or the sleep mode) by biasing one or more internal nodes of the timing circuit and/or the current limiter circuit (e.g., using two 1 nA currents) and may consume a relatively small amount of current in an idle mode (e.g., two 1 nA currents). Also, the timing circuit may generate pulses according to a constant maximum charging current in the inductor or according to a constant output voltage ripple.

Figure 1:
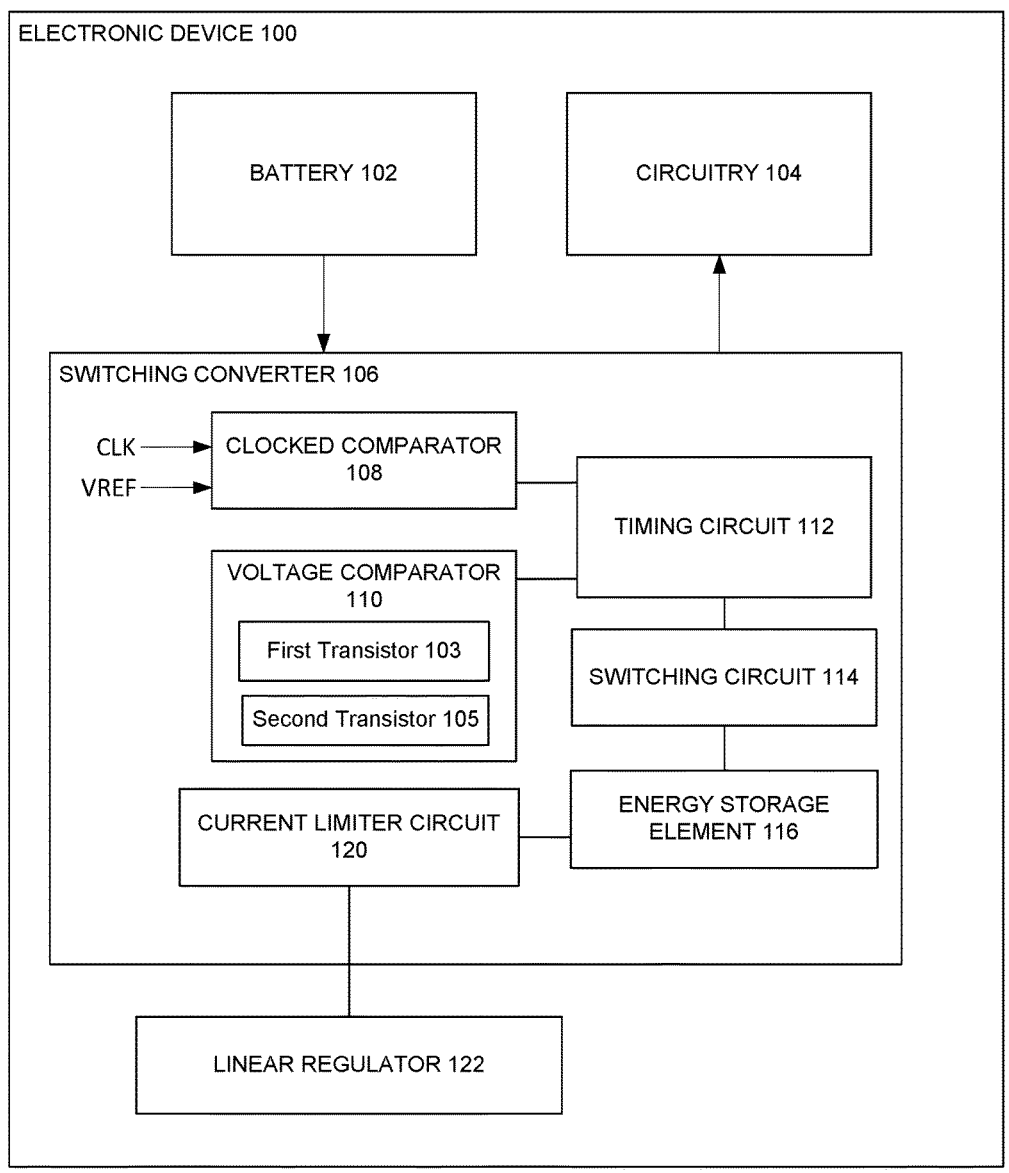
FIG. 1 illustrates an electronic device having a switching converter according to an aspect.

FIG. 1 illustrates an electronic device 100 having a switching converter 106 according to an aspect. The switching converter 106 is a direct current (DC) to DC converter. The electronic device 100 also includes a battery 102 and circuitry 104 that is powered by the battery 102. The electronic device 100 may operate in a run mode and a sleep mode. In the sleep mode, a portion of the circuitry 104 is not powered by the battery 102 (or deactivated) in order to save power consumption. The transitioning from the run mode to the sleep mode (and vice versa) may be programmatically determined by the circuitry 104. In some examples, the electronic device 100 operates in the sleep mode for a majority of the time, and periodically wakes up (or transitions to the run mode) to perform one or more tasks before returning to the sleep mode.

The electronic device 100 may be any type of device that uses a battery 102 to power the circuitry 104. In some examples, the electronic device 100 is a network device that includes a network interface (e.g., Wi-Fi, mobile interface, short-range protocol such as Bluetooth, near field communication (NFC), etc.) configured to connect to a network such as the Internet. In some examples, the electronic device 100 is a medical device that may be implanted into, for example, a body of a patient. The battery 102 may be any type of device that includes one or more electrochemical cells with external connections that provides power to the circuitry 104. In some examples, the battery 102 is, for example, a 3V battery. In some examples, the battery is, for example, a 1.5V battery. However, the battery 102 may provide any level of battery voltage (e.g., ranging from 1.5V to 5V). The circuitry 104 includes integrated circuits configured to perform one or more computer operations according to executable instructions that are stored in memory. In some examples, the circuitry 104 includes a real-time clock, memory, logic components, and/or other type of electronic components.

In the sleep mode, the switching converter 106 is configured to generate a lower output voltage from the voltage provided by the battery 102 in a manner that reduces the current consumption of the electronic device 100. In some examples, the switching converter 106 is configured to efficiently produce an output voltage around 1V from an input voltage around 3V such that the current consumption of the electronic device 100 is reduced (as compared with using only a linear regulator 122). In some examples, the current consumption may be reduced by a factor of three as compared with using only the linear regulator 122. Also, the switching converter 106 may provide improved DC-DC conversion efficiency for a wide operating range (e.g., 100 nA to 100 mA).

In the run mode, the switching converter 106 may activate a charging cycle (e.g., trigger its switching operations) using a clocked comparator 108 to generate and maintain the output voltage at the first voltage level for relatively high loads. In the sleep mode, the switching converter 106 may activate a charging cycle (e.g., trigger its switching operations) using a voltage comparator 110 to generate and maintain the output voltage at the second voltage level for relatively low loads. In some examples, during an idle phase in which the switching operations are idle (which can be in either the run mode or the sleep mode), the switching converter 106 may draw a relatively small amount of current from the battery 102. The switching converter 106 may quickly transition to the charging cycle in which the switching operations are resumed by current biasing one or more internal nodes of the switching converter 106 to be close to their active operating voltages.

The switching converter 106 may include a timing circuit 112, a switching circuit 114, and an energy storage element 116. The timing circuit 112 may include circuitry configured to drive the switching circuit 114. In some examples, the timing circuit 112 is configured to generate driving signals or pulses to control the switching circuit 114. The switching circuit 114 may include one or more switches that are configured to operate according to the driving signals of the timing circuit 112. In some examples, the switching circuit 114 may include a first transistor and a second transistor. In some examples, the switching circuit 114 includes a transistor and a diode. The energy storage element 116 may include at least one of an inductor or a capacitor. The current in the energy storage element 116 is controlled by the switching of the switching circuit 114, which is controlled by the timing circuit 112.

In response to a run mode signal from the circuitry 104, the switching converter 106 may operate in the run mode. In the run mode, the switching converter 106 may generate and maintain the output voltage at the first voltage level using the clocked comparator 108. In the run mode, the clocked comparator 108 compares a reference voltage VREF (e.g., an external reference voltage) to the output voltage at a time indicated by a clock signal CLK, and in response to the output voltage being less than the reference voltage VREF, the clocked comparator 108 may generate a charge signal to trigger a charge cycle to increase the output voltage to be closer to the first voltage level. In some examples, the clocked comparator 108 compares the reference voltage VREF to the output voltage at a rising edge of the clock signal CLK. In response to the charge signal, the timing circuit 112 may generate a timing signal (or pulse) that controls the switching of the switching circuit 114. During the charging phase, the switching circuit 114 causes an increase in current through the energy storage element 116. During a discharge phase, the switching circuit 114 causes a decrease in the current through the energy storage element 116. Then, in response to a subsequent rising edge of the clock signal, the clocked comparator 108 compares the reference voltage VREF to the output voltage, and in response to the output voltage being less than the reference voltage VREF, the clocked comparator 108 generates another charge signal (e.g., a logic high signal) to trigger the timing circuit 112, which causes the switching circuit 114 to pump the output voltage through the charge and discharge phases described above.

In response to a sleep mode signal from the circuitry 104, the switching converter 106 may operate in the sleep mode. In the sleep mode, the switching converter 106 may generate and maintain the output voltage at the second voltage level using the voltage comparator 110. Instead of receiving an external reference signal with respect to the clocked comparator 108, the voltage comparator 110 includes a first transistor 103 and a second transistor 105 that, collectively, define an internal reference voltage. In some examples, the first transistor 103 is an N-channel transistor. In some examples, the second transistor 105 is a P-channel transistor. The second transistor 105 is connected to the first transistor 103 such that the voltage threshold (Vth) of the first transistor 103 in combination with the voltage threshold (Vth) of the second transistor 105 defines the internal reference voltage (e.g. two Vth).

The voltage comparator 110 may compare the output voltage to the internal voltage reference, and, in response to the output voltage being less than the internal voltage reference, the voltage comparator 110 may generate a charge signal to trigger a charge cycle to increase the output voltage to be closer to the second voltage level. In response to the charge signal, the timing circuit 112 may generate a timing signal (or pulse) that controls the switching of the switching circuit 114 for the charge and discharge phases of the charge cycle in the same manner as described above. For example, the switching circuit 114 causes an increase in current through the energy storage element 116, and during a discharge phase, the switching circuit 114 causes a decrease in the current through the energy storage element 116.

The switching converter 106 may include a current limiter circuit 120 configured to limit the amount of current in the energy storage element 116 in order to prevent an overcurrent event. In some examples, the current limiter circuit 120 is part of the timing circuit 112. The current limiter circuit 120 may monitor the amount of current through the energy storage element 116, and, in response to the amount of current through the energy storage element 116 being greater than a threshold level, the current limiter circuit 120 may stop the charging cycle of the switching converter 106. In some examples, the current limiter circuit 120 may automatically switch to the linear regulator 122 to regulate the output voltage in response to the current being greater than the threshold level. In some examples, the energy storage element 116 may become saturated due to a relatively high external magnetic field (e.g., MRI). In these cases, the current limiter circuit 120 may detect a high amount of current through the energy storage element, and then stop the charge cycle of the switching converter 106 and automatically switch to the linear regulator 122 to provide the targeted output voltage. The linear regulator 122 may maintain a steady voltage, where the resistance of the linear regulator 122 varies in accordance with the load resulting in a relatively constant output voltage. In some examples, the linear regulator 122 includes a low dropout regulator (LDO). In some examples, the linear regulator 122 includes a shunt regulator, a series regulator, fixed regulator, or variable regulator.

Figure 2:
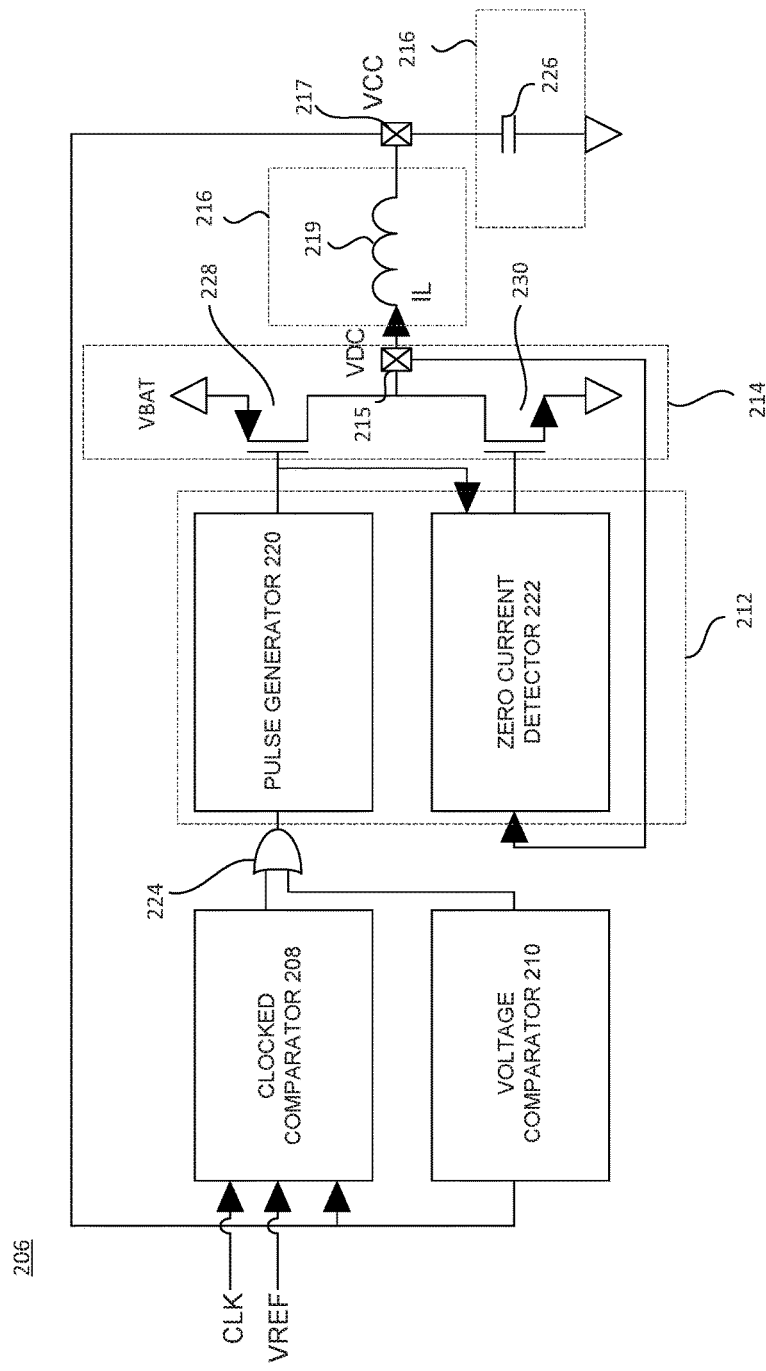
FIG. 2 illustrates a switching converter according to another aspect.

FIG. 2 illustrates a switching converter 206 configured to generate an output voltage VCC from a battery voltage VBAT according to an aspect. In some examples, the switching converter 206 may include any of the features described with reference to the switching converter 106 of FIG. 1. The switching converter 206 includes a clocked comparator 208, a voltage comparator 210, a timing circuit 212, a switching circuit 214, and energy storage elements 216. The timing circuit 212 includes a pulse generator 220 and a zero current detector 222. The switching circuit 214 includes a transistor 228 and a transistor 230. The transistor 228 may be a P-channel transistor. The transistor 230 may be an N-channel transistor. The energy storage elements 216 include an inductor 219 and a capacitor 226.

In some examples, each of the clocked comparator 208, the voltage comparator 210, the pulse generator 220, and the zero current detector 222 has a low static current (e.g., consuming little to zero power from the battery 102 when they are not operating). In some examples, the static current of the clocked comparator 208 is approximately 0 nA, the static current of the voltage comparator 210 is approximately 5 nA, the static current of the pulse generator 220 is approximately 2 nA, and the static current of the zero current detector is approximately 0 nA.

The output of the clocked comparator 208 is connected to a first input of a logic OR gate 224, and the output of the voltage comparator 210 is connected to a second input of the logic OR gate 224. The input of the pulse generator 220 is connected to an output of the logic OR gate 224. The gate of the transistor 228 is connected to the output of the pulse generator 220. The output of the pulse generator 220 is connected to the zero current detector 222. The source of the transistor 228 is connected to the battery voltage VBAT (e.g., connected to the battery 102 of FIG. 1). The drain of the transistor 228 is connected to a node 215. In some examples, the node 215 is a VDC pin or terminal. The drain of the transistor 230 is connected to the node 215. The source of the transistor 230 is connected to ground. The gate of the transistor 230 is connected to the zero current detector 222. The voltage on the node 215 is the voltage VDC, which is provided to the zero current detector 222. The first terminal of the inductor 219 is connected to the node 215, and the second terminal of the inductor 219 is connected to an output node 217. The voltage on the output node 217 is the output voltage VCC. In some examples, the output node 217 is a VCC pin or terminal. The first terminal of the capacitor 226 is connected to the output node 217 and the second terminal of the capacitor 226 is connected to ground.

In response to a run mode signal from the circuitry 104 of FIG. 1, the switching converter 206 may operate in the run mode. In some examples, the power consumption of the switching converter 206 in the run mode is in the milliamp range (e.g., 1 mA to 500 mA). In the run mode, the switching converter 206 may generate and maintain the output voltage VCC at the first voltage level using the clocked comparator 208. In some examples, because the output currents are relatively low, the switching converter 206 may primarily operate in the discontinuous mode.

In the run mode, the clocked comparator 208 may receive the output voltage VCC, a clock signal CLK, and a voltage reference VREF. In some examples, the voltage reference VREF is defined around 1V or 1.2V. In the run mode, the clocked comparator 208 may compare the output voltage VCC with the voltage reference VREF at a rising edge of the clock signal CLK. In response to the output voltage VCC being lower than the voltage reference VREF, the clocked comparator 208 generates a charge signal (e.g., logic high) at the output of the clocked comparator 208, which causes the logic OR gate 224 to transition to a logic high thereby triggering the pulse generator 220 and the zero current detector 222. In some examples, the pulse generator 220 and the zero current detector 222 are current biased to be close to their operating voltages such that the pulse generator 220 and the zero current detector 222 can be quickly activated on the fly. In other words, the pulse generator 220 and the zero current detector 222 are deactivated (thereby saving power) until they are needed to pump the output voltage. In response to the output voltage VCC being equal to or greater than the voltage reference VREF, the output of the clocked comparator 208 remains in a logic low state, thereby not triggering the pulse generator 220.

In response to the pulse generator 220 being triggered, the pulse generator 220 generates a pulse of a certain duration to activate the transistor 228 (e.g., the transistor 228 is activated during the pulse duration). Also, as explained later in the disclosure, the pulse generator 220 may be configured to generate the target voltage according to a constant inductance maximum current or a constant output voltage ripple.

Figures 3A, 3B:
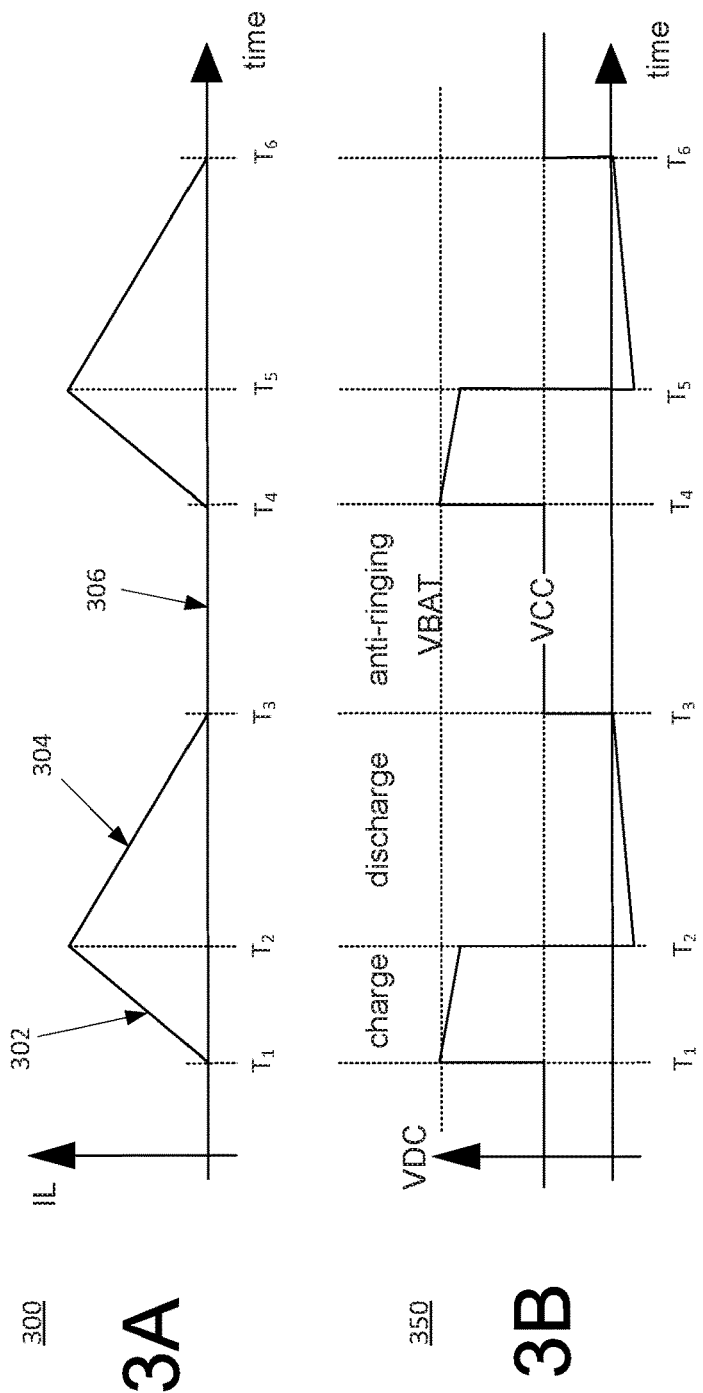
FIG. 3A illustrates a graph depicting a current through an inductor of the switching converter according to an aspect.
FIG. 3B illustrates a graph depicting signals of the switching converter according to an aspect.

FIG. 3A illustrates a graph 300 depicting the current IL through the inductor 219 over time during the charging cycle according to an aspect. FIG. 3B illustrates a graph 350 depicting the output voltage VCC over time during the charging cycle according to an aspect. Referring to FIGS. 2, 3A, and 3B, when the transistor 228 is active (or conducting), the switching converter 206 is within a charge period 302 of the charging cycle (e.g., $T_1$ to $T_2$), and the current through the inductor 219 is increasing linearly (e.g., from zero to the maximum valve).

At the end of the pulse, the transistor 228 is deactivated, and the transistor 230 is activated. When the transistor 228 is deactivated and the transistor 230 is activated, the switching converter 206 is in a discharge period 304 (e.g., $T_2$ to $T_3$). During the discharge period 304, the current through the inductor 219 is decreasing (e.g., negative slope), and the capacitor 226 is recharged. During the discharge period 304, the zero current detector 222 may measure the current at the node 215. The zero current detector 222 may deactivate the transistor 230 in response to the current at the node 215 being zero or substantially close to zero. Then, during an idle period 306 (e.g., $T_3$ to $T_4$), the switching converter 206 waits until the clocked comparator 208 detects a subsequent raising edge of the clock signal CLK, and, in response to the detection of the subsequent rising edge of the clock signal CLK, the clocked comparator 208 compares the output voltage VCC with the voltage reference VREF, and then performs the same operations as described above (e.g., the charging cycle of $T_4$ to $T_5$, and the discharge period of $T_5$ to $T_6$, followed by another idle period). In some examples, during the idle period 306, the inductor 219 may be shorted for anti-ringing purposes.

In response to a sleep mode signal from the circuitry 104 of FIG. 1, the switching converter 206 may operate in the sleep mode. In the sleep mode, the switching converter 206 may generate and maintain the output voltage VCC at the second voltage level using the voltage comparator 210. Instead of receiving an external reference signal with respect to the clocked comparator 208, the voltage comparator 210 has an internal reference voltage (e.g., Vthn+Vthp) collectively defined by the voltage threshold of an N-channel transistor (e.g., Vthn) and the voltage threshold of a P-channel transistor (e.g., Vthp). Unlike the clocked comparator 208, the voltage comparator 210 does not use a clock signal for the comparison. Rather, the voltage comparator 210 may continuously compare the output voltage VCC to the internal reference voltage, and, in response to the output voltage VCC being lower than the internal reference voltage, the voltage comparator 210 may generate a charge signal (e.g., logic high), thereby triggering the pulse generator 220. The timing circuit 212, the switching circuit 214, and the energy storage elements 216 operate in the same manner as discussed with reference to the run mode.

Figure 4:
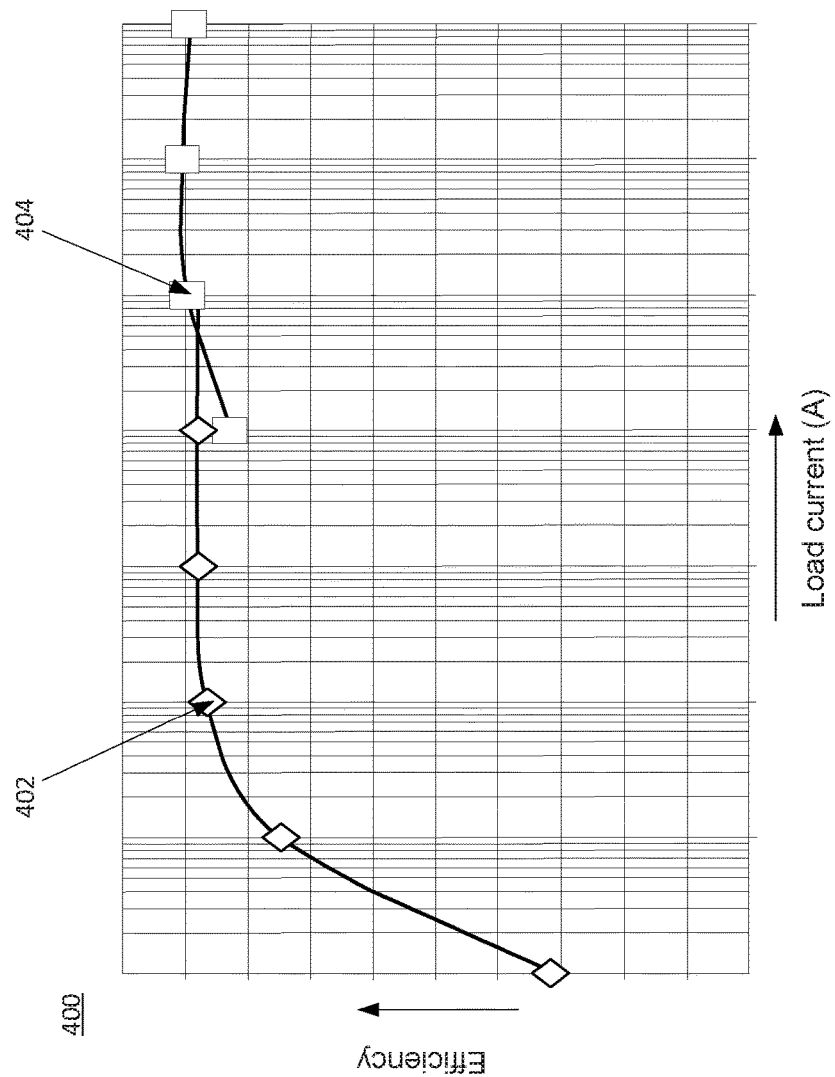
FIG. 4 illustrates a graph depicting the overall efficiency of the switching converter.

FIG. 4 illustrates a graph 400 depicting overall efficiency versus load current for a sleep mode 402 and a run mode 404 of the switching converter 206 according to an aspect. As shown in FIG. 4, the switching converter 206 provides relatively high overall efficiency for a variety of output currents.

Figure 5:
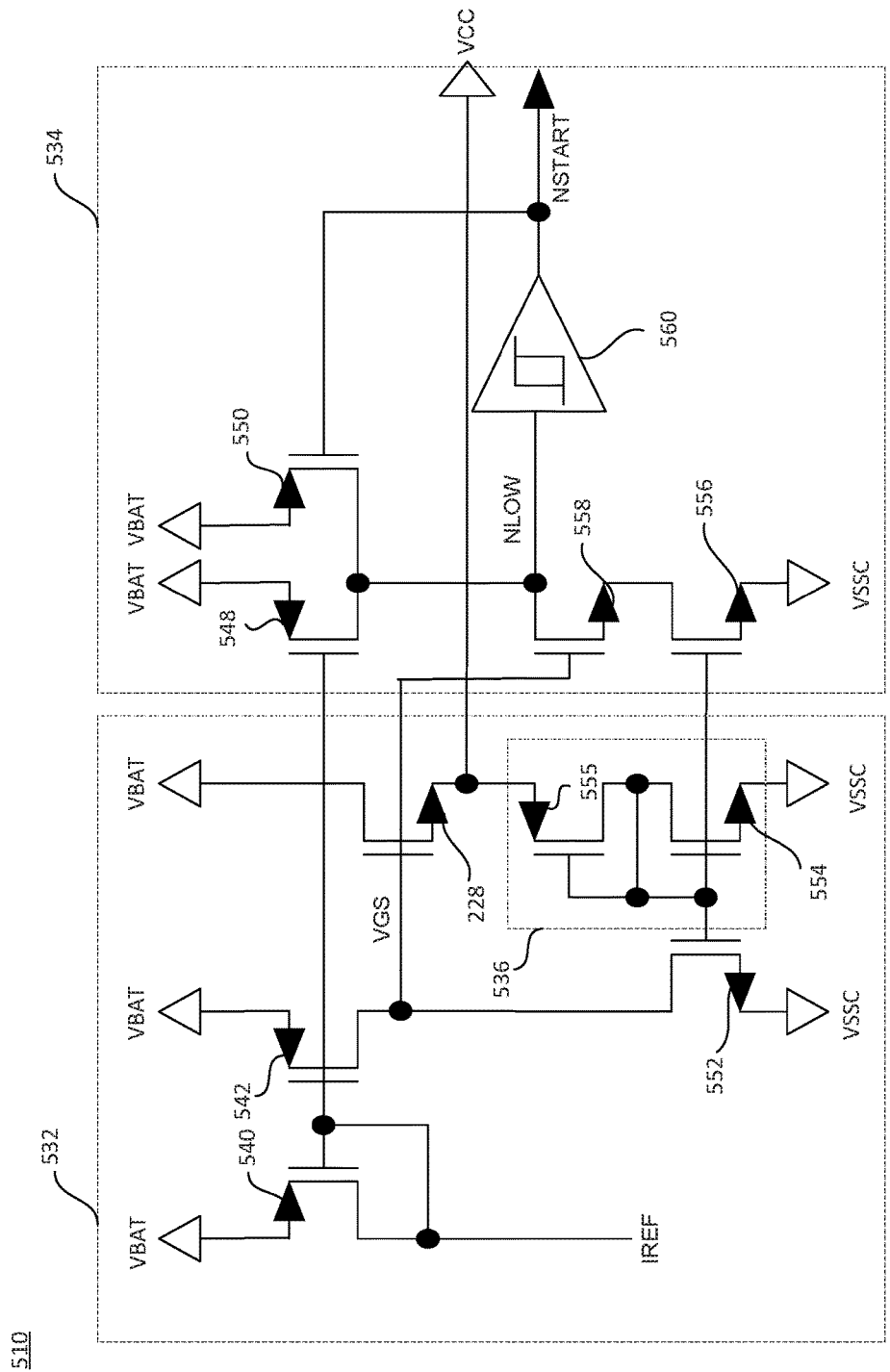
FIG. 5 illustrates a voltage comparator of the switching converter according to an aspect.

FIG. 5 illustrates a voltage comparator 510 according to an aspect. The voltage comparator 510 may be an example of the voltage comparator 110 or 210 of FIGS. 1-2, and may include any of the features discussed with reference to FIGS. 1-2. For example, in the sleep mode, the voltage comparator 510 may compare the internal reference voltage (e.g., 2 Vth) with the output voltage VCC, and, in response to the output voltage VCC being less than the internal reference voltage, the voltage comparator 510 may generate a charge signal NSTART to trigger the pulse generator 220 of FIG. 2.

The voltage comparator 510 may include a transistor stack 536 that defines the internal reference voltage that is compared to the output voltage VCC. The transistor stack 536 includes a transistor 554 and a transistor 555. In some examples, the transistor 554 is an N-channel transistor. In some examples, the transistor 555 is a P-channel transistor. The transistor 555 is connected to the transistor 554 such that the voltage threshold (Vth) of the transistor 555 in combination with the voltage threshold (Vth) of the transistor 554 defines the internal reference voltage (e.g. 2 Vth). The transistor stack 536 is connected to the output voltage VCC and connected to a voltage VSSC. For example, the source of the transistor 555 is connected to the output voltage VCC, and the drain of the transistor 555 is connected to the drain of the transistor 554. The source of the transistor 554 is connected to the voltage VSSC.

The voltage comparator 510 may include a regulator circuit 532 configured to regulate the current through the transistor stack 536. In some examples, the regulator circuit 532 is configured to maintain a constant current (e.g., 1 nA) in the transistor stack 536. For example, the regulator circuit 532 may include a transistor 540, a transistor 542, a transistor 552, and a transistor 554. The transistor 228 is part of the switching circuit 214 of FIG. 2. The voltage VGS is the gate-source voltage of the transistor 228. The drain of the transistor 228 is connected to the battery voltage VBAT, the gate of the transistor 228 is connected to the drain of the transistor 542, and the source of the transistor 228 is connected to the source of the transistor 555.

The transistor 540, the transistor 542, the transistor 552, and the transistor 554 are configured to operate as a current mirror that mirrors a current reference IREF. The output of the current mirror may be provided to the transistor stack 536 (e.g., the gate of the transistor 555 and the gate of the transistor 554 are configured to receive the output of the current mirror). The source of the transistor 540 is connected to the battery voltage VBAT, and the source of the transistor 542 is connected to the battery voltage VBAT. The gate of the transistor 540 is connected to the gate of the transistor 542. The drain of the transistor 540 is configured to receive the current reference IREF. The drain of the transistor 542 is connected to the drain of the transistor 552.

When the current in the transistor stack 536 is too low (e.g., below the constant current), the transistor 542 may pull the voltage VGS up to the battery voltage VBAT, thereby increasing the current in the transistor stack 536. When the current in the transistor stack 536 is too high (e.g., above the constant current), the transistor 552 may pull the voltage VGS low, thereby decreasing the current in the transistor stack 536.

The voltage comparator 510 may include a comparator circuit 534 configured to generate the charge signal NSTART in response to the output voltage being less than the internal reference voltage as defined by the transistor stack 536. The comparator circuit 534 may include a transistor 548, a transistor 550, a transistor 558, and a transistor 556, and a trigger 560.

Figures 6A, 6B:
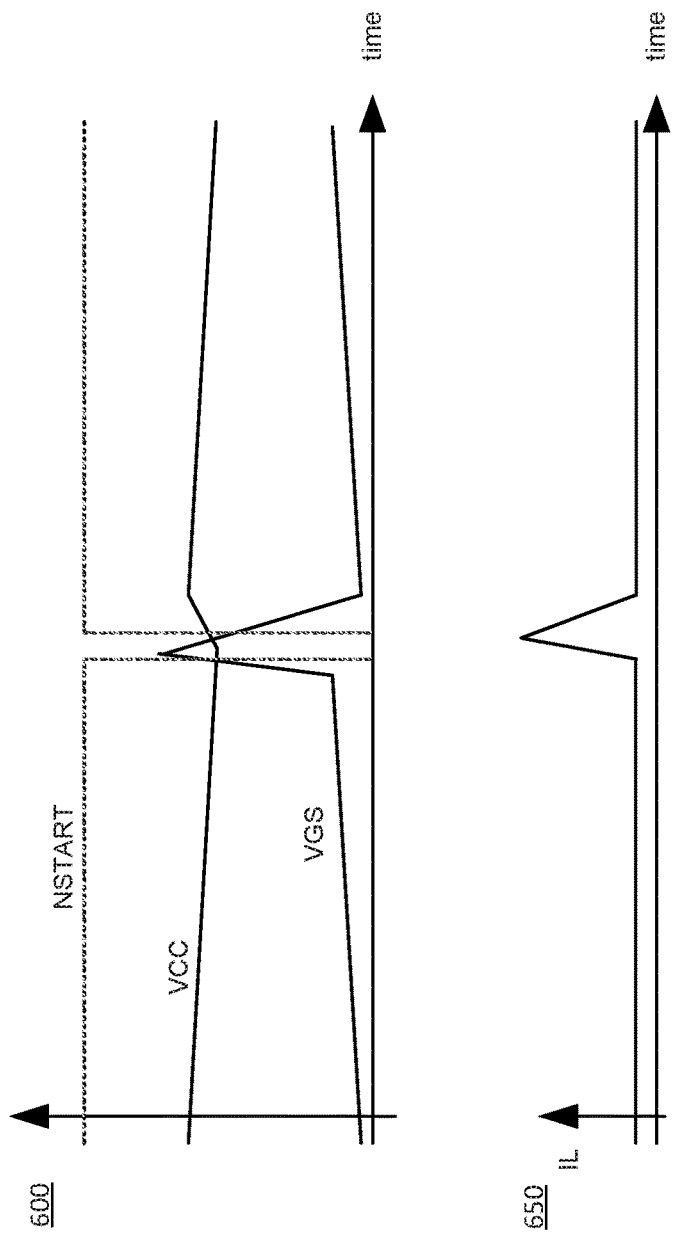
FIG. 6A illustrates a graph depicting signals of a pulse generator of the switching converter according to an aspect.
FIG. 6B illustrates a graph depicting signals of an inductor of the switching converter according to an aspect.

FIG. 6A illustrates a graph 600 depicting the charge signal NSTART, the output voltage VCC, and the voltage VGS over time according to an aspect. FIG. 6B illustrates a graph 650 depicting the current IL through the inductor 219 of FIG. 2 according to an aspect.

Referring to FIGS. 5, 6A, and 6B, when the output voltage is sufficiently high (e.g., greater than the internal reference voltage), the regulator circuit 532 may pull down the voltage VGS. The output voltage VCC may gradually decrease (e.g., caused by the discharging of the capacitor 226). Then, when the output voltage VCC approaches the target voltage, the current in the transistor stack 536 decreases and the voltage VGS increases, and before the transistor 228 is activated, the charge signal NSTART (e.g., an inverted signal) may be generated, which causes the pulse generator 220 of FIG. 2 to become triggered, thereby adding a charge on the capacitor 226 of FIG. 2. In other words, when the voltage VGS increases (due to the output voltage VCC approaching the target voltage), the higher voltage VGS may pull the voltage NLOW down, which toggles the trigger 560 to start the charging/discharging cycle. Then, the voltage NLOW is pulled up again to create a short pulse.

Figure 7:
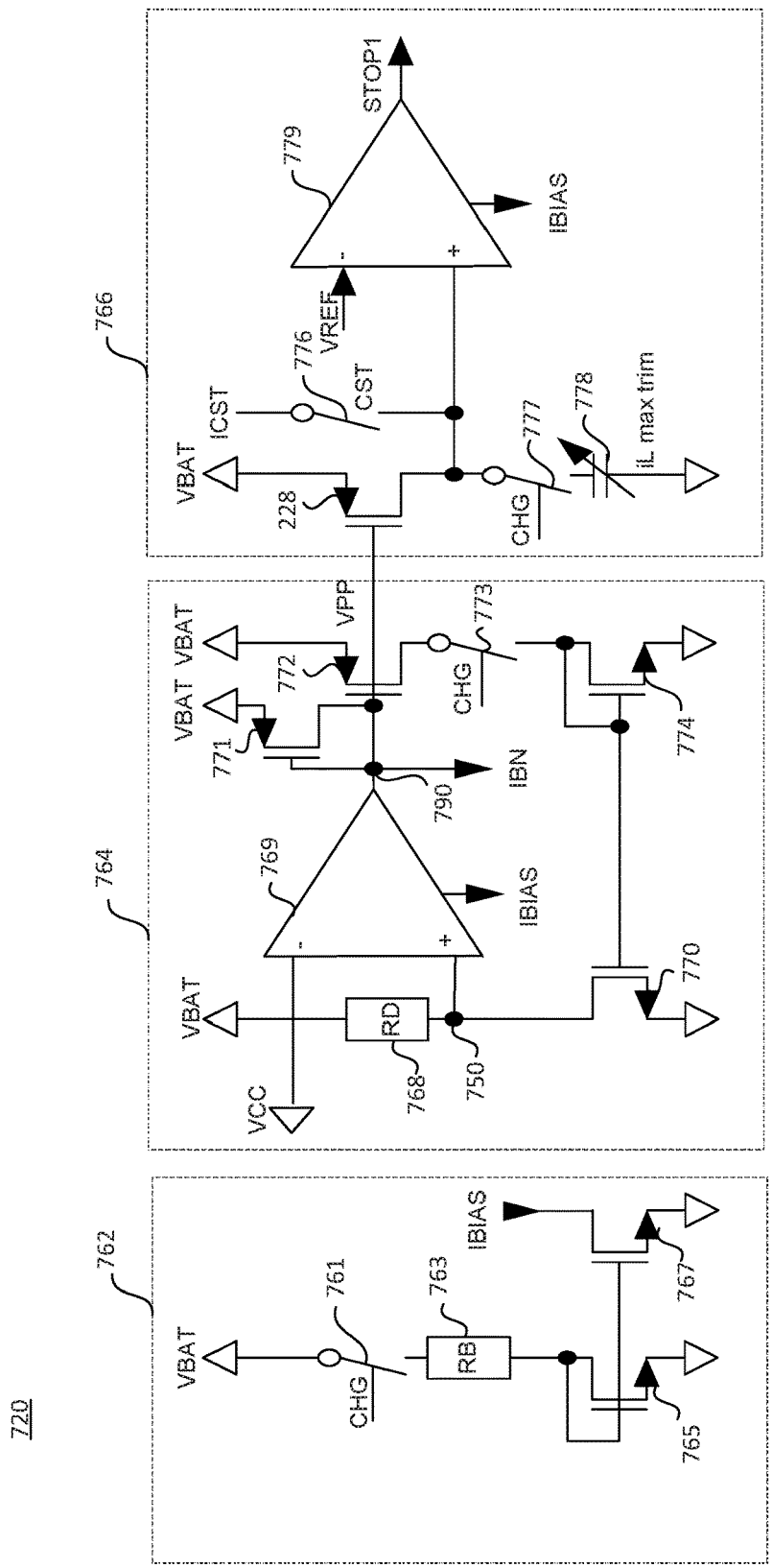
FIG. 7 illustrates a pulse generator of the switching converter according to an aspect.

FIG. 7 illustrates a pulse generator 720 according to an aspect. The pulse generator 720 may be an example of the pulse generator 220 of FIG. 2, and may include any of the features described with reference to FIG. 2. The pulse generator 720 generates a pulse signal having a certain duration. The pulse generator 720 may be biased to be close to its operating voltage such that the pulse generator 720 can start the pulse generation relatively quickly. For example, a node 790 is biased by a biasing current IBN (e.g., 1 nA biasing current).

In some examples, the pulse generator 720 may generate the pulse signal according to a constant charging current in which a constant amount of current (e.g., the maximum amount of current) is provided through the inductor 219. In some examples, the pulse generator 720 may generate the pulse signal according to a constant output voltage ripple in which the inductor current is reduced to provide a constant output voltage ripple. For example, the minimum and maximum of the output voltage VCC defines the voltage ripple, and is dependent on the battery voltage.

For some battery voltage levels, providing a constant current through the inductor 219 may cause higher voltage ripples. Therefore, in order to provide a more constant voltage ripple, the pulse generator 720 may operate according to the constant output voltage ripple. In some examples, the pulse generator 720 generating the pulse current according to the constant charging current provides a better efficiency than the constant output voltage ripple. However, in some examples, the switching converter may be sensitive to voltage ripples so the pulse generator 720 may operate in the constant output voltage ripple configuration.

The pulse generator 720 includes a bias current generator 762 configured to generate a bias current IBIAS, a proportional current generator 764 configured to generate a proportional current (as further described below), and a charge pulse generator 766 configured to generate a ramp for the pulse signal.

The bias current generator 762 includes a switch 761, a resistor RB 763, a transistor 765, and a transistor 767. The switch 761 has a first terminal connected to the battery voltage, and a second terminal connected to the resistor RB 763. The transitioning of the switch 761 between the open position and the closed position is based on the charge signal CHG (e.g., received from either the clocked comparator 208 or the voltage comparator 210). For example, when the charge signal CHG transitions to a logic high, the switch 761 may close, which causes the bias current generator 762 to generate the bias current IBIAS. The transistor 765, and the transistor 767 may be N-channel transistors. The transistor 765 and the transistor 767 may be configured as a current mirror.

The proportional current generator 764 may include a voltage comparator 769, a resistor RD 768, a transistor 770, a transistor 771, a transistor 772, a transistor 774, and a switch 773. The transitioning of the switch 773 between the open position and the closed position is based on the charge signal CHG (e.g., received from either the clocked comparator 208 or the voltage comparator 210).

The transistor 770 and the transistor 774 may be N-channel transistors. The transistor 771 and the transistor 772 may be P-channel transistors. The resistor RD 768 has a first terminal connected to the battery voltage VBAT, and a second terminal connected to the node 750 (e.g. biased by the biasing current IBN). The drain of the transistor 770 is connected to the node 750. The voltage comparator 769 includes a first input connected to the output voltage VCC, a second input connected to the node 750, and an output connected to the node 790. The voltage comparator 769 may compare the output voltage VCC with the voltage at the node 750, and in response to the voltage at the node 750 being greater than the output voltage VCC, the output of the voltage comparator 769 transitions to the logic high state.

The voltage comparator 769 is configured to activate based on the bias current IBIAS generated by the bias current generator 762. The gate of the transistor 771 is connected to the node 790, and the drain of the transistor 771 is connected to the node 790, and the gate of the transistor 772 is connected to the node 790. The source of the transistor 771 and the source of the transistor 772 are connected to the battery voltage VBAT, and the drain of the transistor 772 is connected to the switch 773. The drain of the transistor 774 is connected to the switch 773. The transistor 770 and the transistor 774 are configured to operate as a current mirror.

The charge pulse generator 766 includes a trimmer capacitor 778, a switch 777, a switch 776, and a voltage comparator 779. The transistor 228 may be the P-channel transistor (e.g. part of the switching circuit discussed with reference to FIG. 2. The transitioning of the switch 777 between the open position and the closed position is based on the charge signal CHG (e.g., received from either the clocked comparator 208 or the voltage comparator 210). The transitioning of the switch 776 between the open position and the closed position is based on a signal CST. For example, the pulse generator 720 may generate the pulse signal according to the constant output voltage ripple or the constant charging current in the inductor 219 of FIG. 2, as explained above. If the pulse generator 720 is configured to the constant output voltage ripple, the signal CST may be in the logic high state, which indicates to close the switch 776. If the pulse generator 720 is configured to the constant charging current, the signal CST may be in the logic low state, which indicates to open the switch 776.

The gate of the transistor 228 is connected to the node 790, the source of the transistor 228 is connected to the battery voltage VBAT, and the drain of the transistor 228 is connected to an input of the voltage comparator 779 and the switch 777. When the switch 777 is in the closed position, the trimmer capacitor 778 is connected to the drain of the transistor 228 and the input of the voltage comparator 779. The voltage comparator 779 is configured to activated based on the bias current IBIAS generated by the bias current generator 762. The voltage comparator 779 may compare a reference voltage VREF with the voltage of the trimmer capacitor 778, and, in response to the voltage of the trimmer capacitor 778 exceeding the reference voltage VREF, the output of the voltage comparator 779 transitions to the logic high state.

The pulse generator 720 is activated in response to a charge signal CHG from the clocked comparator 208 or the voltage comparator 210 of FIG. 2 (via the logic OR gate 224 of FIG. 2). For example, in response to the charge signal CHG, the switch 761, the switch 773, and the switch 777 may transition to the closed stated. The quiescent current is limited to a relatively low value (e.g., 1 nA), which is the current used to bias the node 790 close to its operating point.

During the charge period, the bias current generator 762 is activated to generate the bias current IBIAS for voltage comparator 769 and the voltage comparator 779. The bias current IBIAS is proportional to (VBAT−Vthn)/RB, where VBAT is the battery voltage, Vthn is the threshold voltage for the transistor 765, and RB is the value for the resistor RB 763. During the charge period, the proportional current generator 764 is activated to generate the current proportional to (VBAT−VCC)/RD, where VBAT is the battery voltage, VCC is the output voltage, and RD is the value for the resistor RD 768. The current proportional to (VBAT−VCC)/RD is used to charge the trimmer capacitor 778 up to a reference voltage VREF (e.g., a linear ramp from 0V to the reference voltage VREF on the trimmer capacitor 778), which defines the charge duration and in turn the maximum current in the inductor 219 of FIG. 2.

If the constant VCC ripple is selected, the constant current ICST (e.g., coming the current limiter) is added to the proportional current. If the constant output voltage ripple is selected, the switch 776 may transition to the closed state in response to a signal CST, which causes the constant current ICST to be added to the proportional current. As soon as the voltage of the trimmer capacitor 778 reaches the reference voltage VREF (e.g., the output of the voltage comparator 779 goes high), the charging cycle is stopped. For example, the voltage comparator 779 may generate a stop signal STOP1, and the pulse generator 720 transitions back to the idle mode with its low current consumption (e.g., 1 nA).

Figure 8:
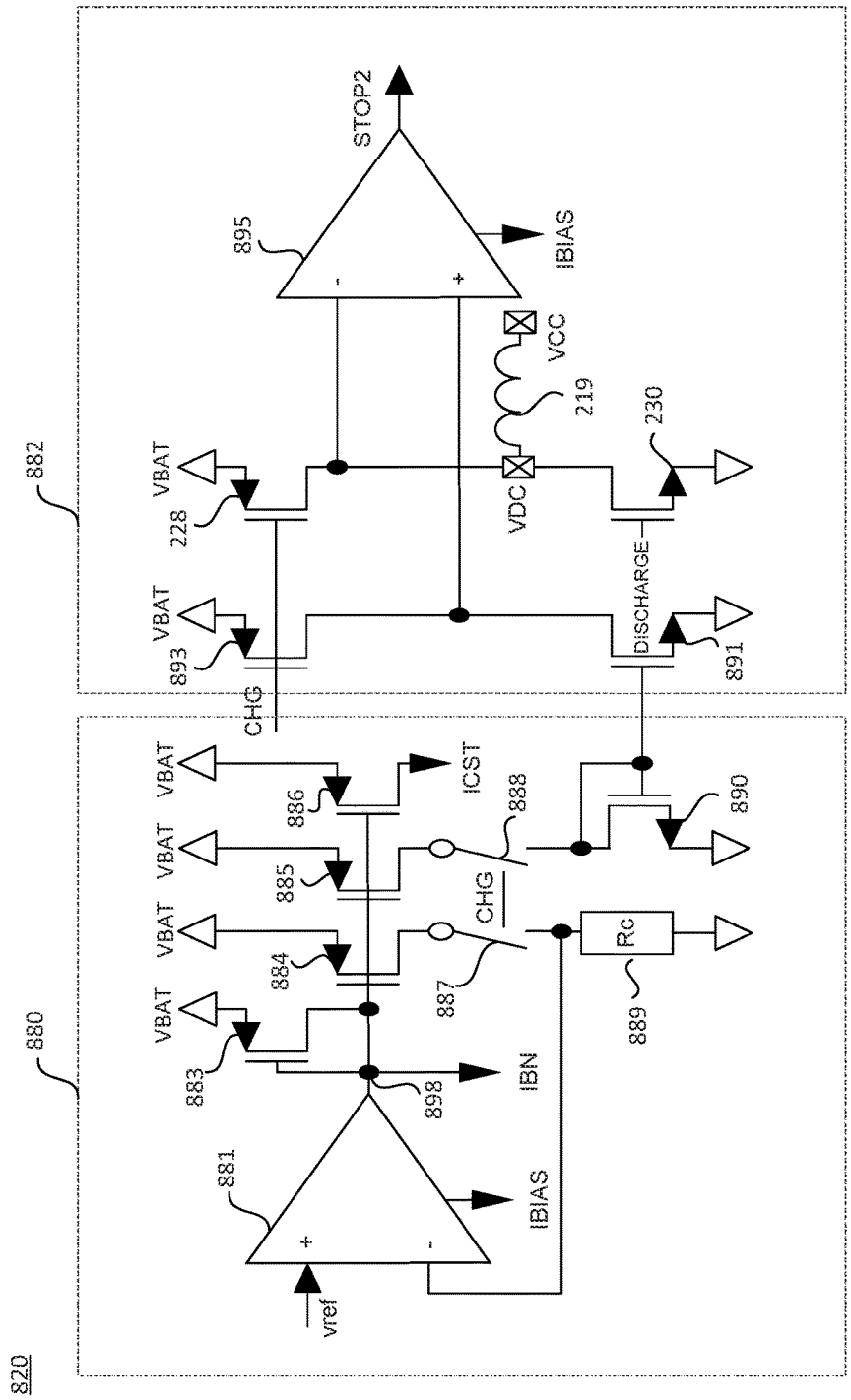
FIG. 8 illustrates a current limiter of the switching converter according to an aspect.

FIG. 8 illustrates a current limiter 820 according to an aspect. The current limiter 820 may be an example of the current limiter circuit 120 of FIG. 1. The current limiter 820 is configured to monitor the current through the inductor 219. The current limiter 820 is configured to stop the charging cycle in response to the current through the inductor 219 is greater than a current limit threshold. The current limiter circuit 120 may be activated only during the charge period. The quiescent current of the current limiter circuit 120 may be limited to a low level (e.g., 1 nA), which is the current IBN used to bias a node 898 close to its operating voltage.

The current limiter 820 includes a constant current generator 880 configured to generate a constant current proportional to VREF/RC, and a current comparator 882 configured to compare the constant current with the current through the inductor 219.

The constant current generator 880 may incudes a voltage comparator 881, a transistor 883, a transistor 884, a transistor 885, a transistor 886, a transistor 890, a resistor 889, a switch 887, and a switch 888. The transistor 883, the transistor 885, and the transistor 886 may be P-channel transistors, and the transistor 890 may be an N-channel transistor. The voltage comparator 881 may be activated based on the current bias IBIAS generated by the pulse generator 220 of FIG. 2. The output of the voltage comparator 881 is connected to the node 898. The source of the transistor 883, the source of the transistor 884, the source of the transistor 885, and the source of the transistor 886 is connected to the battery voltage VBAT. The drain and gate of the transistor 883 is connected to the node 898. The gate of the transistor 884, the gate of the transistor 885, and the gate of the transistor 886 is connected to the node 898. The source of the transistor 884 is selectively connected to the resistor 889 (via the switch 887 which is controlled by the charge signal CHG), and the source of the transistor 885 is selectively connected to the transistor 890 (via the switch 888 which is controlled by the charge signal CHG). The source of the transistor 886 is configured to receive the constant current ICST.

The current comparator 882 may include a transistor 893, a transistor 891, and a voltage comparator 895. The transistor 228 and the transistor 230 are the switching transistors and previously discussed with reference to FIG. 2. The gate of the transistor 893 is configured to receive the charge signal CHG. The transistor 893 and the transistor 228 are configured to operate as a current mirror (1:N). The drain of the transistor 893 is connected to the drain of the transistor 891. The gate of the transistor 891 is connected to the gate of the transistor 890.

If the drain-source voltage of the transistor 228 exceeds the drain-source voltage of a divided by N version of the transistor 228 (loaded with the above generated constant current), this is detected by the voltage comparator 895, which stops the charging cycle (STOP2). In normal conditions, the signal STOP2 will not be triggered as the pulse generator 720 will stop the charging cycle. However, if the inductor 219 is shorted or placed in a very high magnetic field (e.g., an MRI), the effective inductance may be much lower than normal (due to saturation) and the current may rise much faster than normal, reaching the current limit threshold. In such an event, the switching circuit may switch to linear regulation (LDO mode) to avoid any damage to remain functional.

Figure 9:
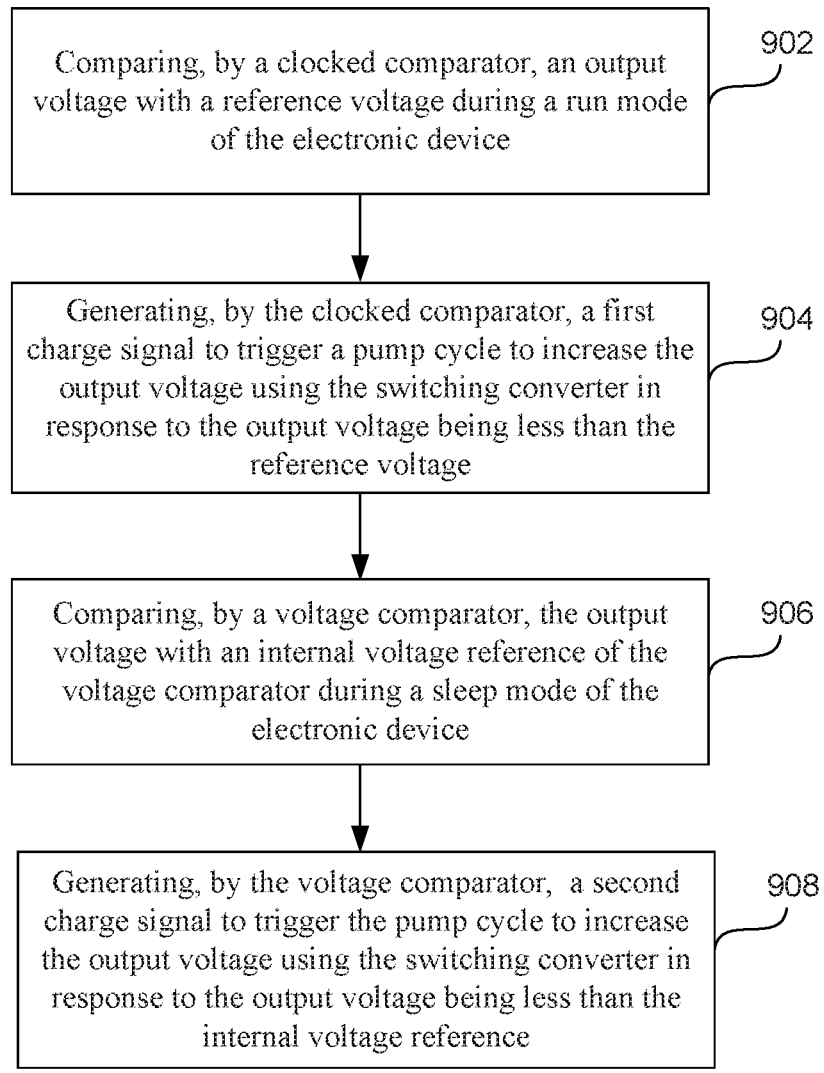
FIG. 9 illustrates a flow chart depicting example operations of the switching converter according to an aspect.

FIG. 9 illustrates a flowchart 900 depicting example operations of a switching converter according to an aspect. Although the flowchart 900 of FIG. 9 illustrates operations in sequential order, it will be appreciated that this is merely an example, and that additional or alternative operations may be included. Further, operations of FIG. 9 and related operations may be executed in a different order than that shown, or in a parallel or overlapping fashion. The operations of FIG. 9 may be performed by any of the switching converters discussed herein.

Operation 902 includes comparing, by a clocked comparator, an output voltage with a reference voltage during a run mode of the electronic device.

Operation 904 includes generating, by the clocked comparator, a first charge signal to trigger a pump cycle to increase the output voltage using the switching converter in response to the output voltage being less than the reference voltage.

Operation 906 includes comparing, by a voltage comparator, the output voltage with an internal voltage reference of the voltage comparator during a sleep mode of the electronic device.

Operation 908 includes generating, by the voltage comparator, a second charge signal to trigger the pump cycle to increase the output voltage using the switching converter in response to the output voltage being less than the internal voltage reference.

It will be understood that, in the foregoing description, when an element is referred to as being connected to, electrically connected to, coupled to, or electrically coupled to another element, it may be directly connected or coupled to the other element, or one or more intervening elements may be present. In contrast, when an element is referred to as being directly connected to or directly coupled to another element, there are no intervening elements. Although the terms directly connected to, or directly coupled to may not be used throughout the detailed description, elements that are shown as being directly connected or directly coupled can be referred to as such. The claims of the application, if any, may be amended to recite exemplary relationships described in the specification or shown in the figures. Implementations of the various techniques described herein may be implemented in (e.g., included in) digital electronic circuitry, or in computer hardware, firmware, software, or in combinations of them. Portions of methods also may be performed by, and an apparatus may be implemented as, special purpose logic circuitry, e.g., an FPGA (field programmable gate array) or an ASIC (application specific integrated circuit).

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An electronic device comprising:
   a switching converter configured to generate an output voltage with a first voltage level from a battery voltage in a run mode of the electronic device, the switching converter configured to generate the output voltage with a second voltage level from the battery voltage in a sleep mode of the electronic device, the second voltage level being less than the first voltage level, the switching converter including a clocked comparator, and a voltage comparator,
   the switching converter configured to generate the output voltage with the first voltage level in the run mode using the clocked comparator,
   the switching converter configured to generate the output voltage with the second voltage level in the sleep mode using the voltage comparator,
   the voltage comparator configured to compare an internal reference voltage with the output voltage, and, in response to the internal reference voltage being less than the output voltage, the voltage comparator is configured to generate a charge signal to trigger a pump cycle to change the output voltage to be closer to the second voltage level.

2. The electronic device of claim 1, wherein the voltage comparator includes a first transistor and a second transistor, the first transistor being coupled to the second transistor such that a voltage threshold of the first transistor in combination with a voltage threshold of the second transistor defines the internal reference voltage.

3. The electronic device of claim 1, wherein the switching converter includes a pulse generator connected to the clocked comparator and the voltage comparator, the pulse generator configured to generate a pulse signal during the run mode in response to a charge signal from the clocked comparator, the pulse generator configured to generate a pulse signal during the sleep mode in response to the charge signal from the voltage comparator.

4. The electronic device of claim 3, wherein the pulse generator includes a current bias generator configured to generate a bias current to bias one or more nodes of the pulse generator.

5. The electronic device of claim 3, wherein the pulse generator is configured to generate the pulse signal in the run mode or the sleep mode according to a constant charging current in which a constant amount of current is provided through an inductor of the switching converter.

6. The electronic device of claim 3, wherein the pulse generator is configured to generate the pulse signal in the run mode or the sleep mode according to a constant output voltage ripple.

7. The electronic device of claim 1, wherein the switching converter includes a current limiter configured to monitor a current through an inductor of the switching converter, and, in response to the current through the inductor exceeding a current threshold, the current limiter is configured to stop a charge cycle.

8. The electronic device of claim 7, wherein the electronic device includes a linear regulator, and the current limiter is configured to trigger the linear regulator in response to the current through the inductor exceeding the current threshold.

9. An electronic device comprising:
a switching converter configured to generate an output voltage with a first voltage level from a battery voltage in a run mode of the electronic device, the switching converter configured to generate the output voltage with a second voltage level from the battery voltage in a sleep mode of the electronic device, the second voltage level being less than the first voltage level, the switching converter including:
a clocked comparator configured to compare a reference voltage with the output voltage at a time indicated by a clock signal, the clocked comparator configured to generate a first charge signal during the run mode in response to the reference voltage being less than the output voltage;
a voltage comparator configured to generate a second charge signal during the sleep mode; and
a pulse generator configured to generate a pulse signal for driving a switching circuit in response to either the first charge signal or the second charge signal.

10. The electronic device of claim 9, wherein the voltage comparator is configured to compare an internal reference voltage with the output voltage, and, in response to the internal reference voltage being less than the output voltage, the voltage comparator is configured to generate the second charge signal.

11. The electronic device of claim 10, wherein the voltage comparator includes a first transistor and a second transistor, the first transistor being coupled to the second transistor such that a voltage threshold of the first transistor in combination with a voltage threshold of the second transistor defines the internal reference voltage.

12. The electronic device of claim 9, wherein the pulse generator includes a current bias generator configured to generate a bias current to bias one or more nodes of the pulse generator.

13. The electronic device of claim 9, wherein the pulse generator is configured to generate the pulse signal in the run mode or the sleep mode according to a constant charging current in an inductor of the switching converter.

14. The electronic device of claim 9, wherein the pulse generator is configured to generate the pulse signal in the run mode or the sleep mode according to a constant output voltage ripple.

15. A method for reducing current consumption in an electronic device having a switching converter;
comparing, by a clocked comparator, an output voltage with a reference voltage during a run mode of the electronic device;
generating, by the clocked comparator, a first charge signal to trigger a pump cycle to increase the output voltage using the switching converter in response to the output voltage being less than the reference voltage;
comparing, by a voltage comparator, the output voltage with an internal voltage reference of the voltage comparator during a sleep mode of the electronic device; and
generating, by the voltage comparator, a second charge signal to trigger the pump cycle to increase the output voltage using the switching converter in response to the output voltage being less than the internal voltage reference.

16. The method of claim 15, further comprising:
monitoring a current through an inductor of the switching converter;
stopping a charge cycle of the switching converter in response to the current exceeding a current threshold; and
increasing the output voltage using a linear regulator instead of the switching converter.

17. The method of claim 15, further comprising:
generating, by a pulse generator, a pulse signal to control switching operations of the switching converter in response to the first charge signal or the second charge signal.

18. An electronic device comprising:
a switching converter configured to generate an output voltage with a first voltage level from a battery voltage in a run mode of the electronic device, the switching converter configured to generate the output voltage with a second voltage level from the battery voltage in a sleep mode of the electronic device, the second voltage level being less than the first voltage level, the switching converter including a clocked comparator, and a voltage comparator,
the switching converter configured to generate the output voltage with the first voltage level in the run mode using the clocked comparator, the switching converter configured to generate the output voltage with the second voltage level in the sleep mode using the voltage comparator,
the clocked comparator configured to compare a reference voltage with the output voltage at a time indicated by a clock signal, and, in response to the reference voltage being less than the output voltage, the clocked comparator being configured to generate a charge signal to trigger a pump cycle to change the output voltage to be closer to the first voltage level.

19. The electronic device of claim 18, wherein the switching converter includes a pulse generator connected to the clocked comparator and the voltage comparator.

20. The electronic device of claim 18, wherein the switching converter includes a current limiter configured to monitor a current through an inductor of the switching converter, and, in response to the current through the inductor exceeding a current threshold, the current limiter is configured to stop a charge cycle.

* * * * *